United States Patent
Landin et al.

[11] Patent Number: 6,132,882
[45] Date of Patent: *Oct. 17, 2000

[54] DAMPED GLASS AND PLASTIC LAMINATES

[75] Inventors: Donald T. Landin, Eagan, Minn.; Boris V. Gregl, Duisburg, Germany; Thomas Coratti, Walled Lake, Mich.

[73] Assignee: 3M Innovative Properties Company, St. Paul Minnesota, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/766,999

[22] Filed: Dec. 16, 1996

[51] Int. Cl.[7] ............................................. B32B 17/10
[52] U.S. Cl. ........................... 428/437; 428/436; 428/451
[58] Field of Search .................. 428/436, 437, 428/483, 451

[56] References Cited

U.S. PATENT DOCUMENTS

| | | | |
|---|---|---|---|
| 4,427,734 | 1/1984 | Johnson | 428/234 |
| 4,427,743 | 1/1984 | Katsuki et al. | 428/424.6 |
| 4,605,592 | 8/1986 | Paquette et al. | 428/334 |
| 4,943,461 | 7/1990 | Karim | 428/40.4 |
| 4,946,742 | 8/1990 | Landin | 428/354 |
| 4,985,488 | 1/1991 | Landin | 524/555 |
| 5,079,047 | 1/1992 | Bogaert et al. | 428/41.3 |
| 5,154,953 | 10/1992 | de Moncuit et al. | 428/34 |
| 5,183,863 | 2/1993 | Nakamura et al. | 525/438 |
| 5,262,232 | 11/1993 | Wilfong et al. | 428/327 |
| 5,308,887 | 5/1994 | Ko et al. | 522/148 |
| 5,352,528 | 10/1994 | L'Her et al. | 428/426 |
| 5,368,917 | 11/1994 | Rehfeld et al. | 428/215 |

FOREIGN PATENT DOCUMENTS

| | | |
|---|---|---|
| 0 457 190 A1 | 11/1991 | European Pat. Off. . |
| 0 517 114 A1 | 12/1992 | European Pat. Off. . |
| 02229742 | 12/1990 | Japan . |
| 05310450 | 11/1993 | Japan . |
| 06191905 | 7/1994 | Japan . |
| 06206739 | 7/1994 | Japan . |
| 07081982 | 3/1995 | Japan . |
| 06166551 | 6/1996 | Japan . |
| 828381 | 2/1960 | United Kingdom . |

OTHER PUBLICATIONS

*McGraw Hill Encyclopedia of Science & Technology*, 6th Edition, vol. 16, McGraw Hill, 1987, pp. 3–4.
English language abstract for JP06166551.
Questions & Answers, Answers To the Most Asked Questions About Residential Glass: Its Applications, Features and Benefits, Saflex Home Page, pp.1–7. http://www.monsanto.com/saflex/faq/, Feb. 10, 1997.
Society of Automotive engineers (SAE)J1400, "Laboratory Measurements of the Airborne Noise Reduction of Acoustical Materials," May 1989.

*Primary Examiner*—D. S. Nakarani
*Attorney, Agent, or Firm*—Melissa M. Hayworth; Lisa M. McGeehan

[57] ABSTRACT

The present invention provides a damped glass and/or plastic laminate which damps both sounds and vibrations which is particularly useful for vehicle windows such as automobile windows, aircraft windows, watercraft windows, etc.; office building windows; airport windows; etc. The laminate comprises outer rigid layers such as glass or plastic and at least one inner layer of vibration damping material and a flexible plastic material such as polyvinyl butyral.

19 Claims, 3 Drawing Sheets

DAMPED GLASS AND PLASTIC LAMINATES

FIELD OF THE INVENTION

The present invention provides a damped glass and/or plastic laminate which damps both sounds and vibrations which is particularly useful for vehicle windows such as automobile windows, train windows, aircraft windows, watercraft windows, etc.; office building windows; airport windows; etc.

BACKGROUND OF THE INVENTION

Rehfeld et. al, U.S. Pat. No. 5,368,917, assigned to Saint Gobain Vitrage International, discloses an acoustic glazing for a vehicle, especially a motor vehicle. These articles serve to damp noises of aerodynamic origin (Col. 1, lines 49–51) at frequencies of more than 800 Hz. The '917 patent describes windshields having two glass sheets separated by a plastic sheet or air space interlayer.

Additional glass laminate constructions useful for noise insulation are disclosed in JP07081982, JP06191905, and JP06166551. Other laminates are disclosed in U.S. Pat. Nos. 4,427,734 and 5,154,953 and JP 06206739 and JP 05310450.

Conventional safety glass is discussed in the *MCGRAW-HILL ENCYCLOPEDIA OF SCIENCE AND TECHNOLOGY*, Vol. 16, pages 3 to 4 (1986). It is defined as a unitary structure formed of two or more sheets of glass between each of which is interposed a sheet of plastic, usually polyvinyl butyral. According to the reference it is typically produced by first assembling two clean and dry sheets of plate glass and a sheet of plastic under slight pressure to produce a void-free bond. The laminate is then pressed at 75–225 psi (0.5 to 1.5 megapascals) under heat at 239–302° F. (115 to 150° C.) long enough to unite. The reference indicates that for installation in surface vehicles the finished laminated glass is approximately ¼ inch thick (6 mm) thick. For use in aircraft the finished glass laminate is thicker. The plastic interlayer has the ability to yield rather than rupture under impact. Due to this property and the adherence of the glass to the plastic, the laminated glass presents less hazard from flying or scattered glass chips in event of damage than would an equal thickness of glass. According to the reference, however, the nonrigid plastic layer lowers the modulus of rupture of the laminate to approximately 60 percent of that of monolithic glass at room temperature. The thermoplastic interlayer also makes other properties of safety glass appreciably temperature dependent. Optionally, safety glass has substantially the properties of the glass sheets of which it is made. However, according to the reference, above about 160° F. (70° C.) the organic plastic may deteriorate. Most safety glass is used in automotive vehicles where the plastic interlayer is 0.030 inch (0.75 mm) thick. According to the reference it is also used in ships, locomotives, railroad cars, aircraft, safety goggles and viewing windows. Formed from tempered glass and in multiple layers and built up to greater thickness, the laminate is used in bullet resisting structures in banks, jewelry display cases, vehicles, and test-chamber windows. The glass or plastic may be tinted to provide color filtering.

Safety glass is discussed also in "Questions & Answers, Answers To The Most Asked Questions About Residential Glass: Its Applications, Features and Benefits", Safeflex Home Page Oct. 25, 1996, pages 1–7, http://www.monsanto.com//saflex/faq/.

A laminated pane is disclosed in U.S. Pat. No. 5,352,528, assigned to Saint-Gobain Vitrage International.

SUMMARY OF THE INVENTION

Although glass laminates have been available that damp at higher frequencies such as 800 to 1000 Hz a need exists for a laminate that damps at lower frequencies of less than 200 Hz in addition to frequencies in the range of 800 to 1000 Hz (typically 20 to 1000 Hz at −10 to 50° C.). The present invention provides such a laminate. The article of the present invention provides damping over a wide frequency range which includes the range of 20 to 200 Hz.

The present invention provides a novel article comprising a laminate, wherein the laminate comprises:
  (a) a first rigid layer formed from a material selected from the group consisting of glass and plastic;
  (b) a second rigid layer formed from a material selected from the group consisting of glass and plastic;
  (c) a vibration damping material layer(s) positioned between the first rigid layer and the second rigid layer;
  (d) a first layer of a flexible plastic positioned between the first rigid layer and the vibration damping material layer(s), wherein the first layer of flexible plastic is of such a nature that a test construction of the layer of flexible plastic laminated between two sheets of annealed glass, each sheet of annealed glass having a thickness of 2.5 mm, would pass the Consumer Product Safety Commission test 16CFR, Part 1201, Category I; and
  (e) optionally a second layer of a flexible plastic positioned between the second rigid layer and the vibration damping material layer(s) wherein the second layer of flexible plastic is of such a nature that a test construction of the second layer of flexible plastic laminated between two sheets of annealed glass, each sheet of annealed glass having a thickness of 2.5 mm, would pass the Consumer Product Safety Commission test 16CFR, Part 1201, Category I.

The glass embodiment of the article of the present invention has the advantage that it has superior damping (especially for the temperatures and frequencies experienced by windshields and side glass in automobiles) and potentially may be able to meet safety glass requirements depending on the materials used, their dimensions, the number of layers, etc.

The vibration damping material layer(s) should be thick enough to provide adequate damping properties. If the vibration damping material layer(s) is too thick, clarity problems could arise. A thinner vibration damping material layer(s) may provide for easier manufacturing as a glass construction having a thinner vibration damping material layer(s) would be more similar in dimension to conventional safety glass which it may potentially, depending on its properties, be used to replace.

When the laminate article of the present invention goes into resonance, the layer(s) of vibration damping material is put into shear and dissipates energy as heat rather than noise. The present invention is particularly advantageous in that good results can be obtained even using a relatively thin layer(s) of vibration damping material. Thus, the article of the present invention which may potentially, depending on its construction, have safety properties, provides improved properties with respect to vibration damping compared to conventional safety glass with only a negligible increase in thickness.

Preferably, the first layer of a flexible plastic positioned between the first rigid layer and the vibration damping material layer(s) of the article of the invention is of such a nature that a test construction of the first layer of flexible plastic laminated between two sheets of annealed glass, each sheet of annealed glass having a thickness of 2.5 mm, would pass the Consumer Product Safety Commission test 16CFR, Part 1201, Category II; and preferably the optional second layer of flexible plastic positioned between the second rigid layer and the vibration damping material layer(s) is of such a nature that a test construction of the second layer of flexible plastic laminated between two sheets of annealed glass, each sheet of annealed glass having a thickness of 2.5 mm, would pass the Consumer Product Safety Commission test 16CFR, Part 1201, Category II.

In one embodiment, the article of the invention may be of such a nature that the laminate is transparent.

In another embodiment the article of the invention may be colorless.

In another embodiment the second layer of flexible plastic is present.

In another embodiment of the article of the present invention the first rigid layer is glass and the second rigid layer is glass.

A preferred vibration damping material layer(s) is selected from the group consisting of urethane rubbers, silicone rubbers, nitrile rubbers, butyl rubbers, acrylic rubbers, natural rubbers, styrene-butadiene rubbers, polyesters, polyurethanes, polyamides, ethylene-vinyl acetate copolymers, and epoxy-acrylate interpenetrating networks. Each vibration damping material layer may optionally comprise a combination of vibration damping materials. When more than one layer of vibration damping material is present each layer may optionally comprise a different vibration damping material.

The article of the present invention has a variety of uses. The article of the invention may, for example, be selected from the group consisting of land vehicle glazing, architectural glazing, aircraft glazing, and watercraft glazing. The article of the invention thus may be used, as a window for a vehicle or a structure. For example, the article of the invention may be a windshield. The present invention also provides a vehicle having at least one article of the present invention (a windshield, for example) fitted therein. The present invention also provides a structure (such as a building) having at least one article of the present invention fitted therein.

In another embodiment of the article of the present invention at least one of the vibration damping material layer(s) is plasticizer resistant. The article of the invention may optionally further comprise a flexible plastic layer which is resistant to plasticizer between the vibration damping material layer(s) and the first flexible plastic layer (such as polyvinyl butyral layer) and optionally a second flexible plastic layer which is resistant to plasticizer between the vibration damping material layer(s) and the second flexible plastic layer (such as a polyvinyl butyral layer), if the second flexible plastic layer is present.

In another embodiment the article of the invention is of such a nature that it would pass the Consumer Product Safety Commission test 16CFR, Part 1201, Category I (described later herein). In another embodiment the article of the invention is of such a nature that it would pass the Consumer Product Safety Commission test 16CFR, Part 1201, Category II.

DETAILED DESCRIPTION OF THE INVENTION

Rigid Layers

Figure 1:
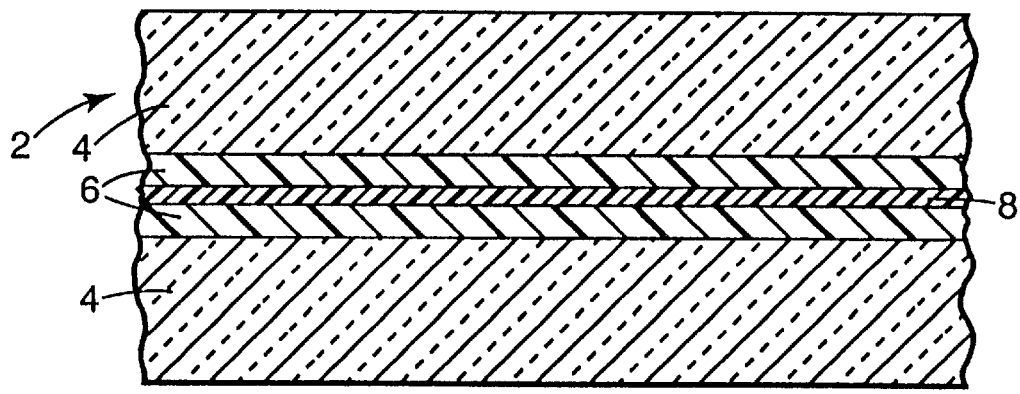
FIG. 1 illustrates a side view of an embodiment of the article of the invention.

Examples of suitable rigid layers are those selected from the group consisting of glass and plastic. The rigid layers are typically of the same material (both glass or both plastic, for example). Optionally the rigid layers may be of different materials. Examples of suitable rigid plastics include but are not limited to those selected from the group consisting of polycarbonate, polystyrene, polyacrylate, polymethylmethacrylate, and polyvinylchloride. Examples of suitable glass include but are not limited to plate glass, float glass, window glass, tempered glass, annealed glass, and Pyrex™ glass (a borosilicate glass). Preferably the rigid layer is glass for reasons of optical clarity, resistance to aging (yellowing and degradation), and resistance to organic solvents. The glass used is typically annealed glass.

A suitable rigid layer typically has a tensile modulus of at least about $1 \times 10^{10}$ dyne/cm$^2$, preferably at least about $1 \times 10^{11}$ dyne/cm$^2$, and most preferably at least about $5 \times 10^{11}$ dyne/cm$^2$. Useful rigid materials are typically transparent and colorless, although in some applications they may optionally be tinted. Also for some applications the rigid layers may optionally be translucent or opaque.

Vibration Damping Material

The vibration damping material (VDM) can include any material that is viscoelastic. A viscoelastic material is one that is viscous, and therefore capable of dissipating energy, yet exhibits certain elastic properties, and therefore capable of storing energy at the desired temperature and frequency range. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials according to the present invention have a storage modulus, i.e., measure of the energy stored during deformation, of at least about 1 psi ($6.9 \times 10^3$ Pascals) at the operating temperature and frequency (typically about −40 to 150° C. and about 1 to 10,000 Hz). The storage modulus of useful viscoelastic materials can be as high as 500,000 psi ($3.45 \times 10^9$ Pascals); however, typically it is about 10 to about 2000 psi (about $6.9 \times 10^4$ to about $1.4 \times 10^7$ Pascals). Particularly preferred viscoelastic materials provide the damped laminate article with a strain energy ratio, i.e., fraction of strain energy stored in the damping material relative to the total strain energy stored in the structure, of at least about 2%.

Suitable viscoelastic materials, at the operating temperature and frequency, for use in the vibration damping materials have a loss factor, i.e., the ratio of energy loss to energy stored, of at least about 0.01. Preferably the loss factor is at least about 0.1, more preferably about 0.5 to about 10, and most preferably about 1 to about 10, at the operating frequency and temperature experienced by the material. This loss factor represents a measure of the energy dissipation of the material and depends on the frequency and temperature experienced by the damping material. For example, for a certain crosslinked acrylic polymer (acrylic vibration damping material 3M Brand ISD 112 Viscoelastic Damping Polymer, commercially available from Minnesota Mining and Manufacturing Company, St. Paul, Minn.), at a frequency of 100 Hz, the loss factor at 68° F. (20° C.) is about 1.0, while at 158° F. (70° C.) the loss factor is about 0.7.

Preferred viscoelastic materials are those that remain functional over a wide range of temperatures, e.g., −40° F. (−40° C.) to 300° F. (149° C.). Most preferred viscoelastic materials are those that cover the broadest temperature and frequency range at the desired minimum loss factor and storage modulus to achieve acceptable damping of the damped laminate article and which do not experience a significant degradation in properties due to long exposures to high temperatures or short exposures beyond these high temperature levels.

Useful viscoelastic damping materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include, but are not limited to, those selected from the group consisting of urethane rubbers, silicone rubbers, nitrile rubbers, butyl rubbers, acrylic rubbers, natural rubbers, mixtures thereof, and the like. Other useful vibration damping viscoelastic materials include polyesters, polyurethanes, polyamides, ethylene-vinyl acetate copolymers, epoxy-acrylate interpenetrating networks, and the like. Specific examples of useful materials are disclosed or referenced in Nakamura et. al., U.S. Pat. No. 5,183,863 (issued Feb. 2, 1993), Wilfong et. al, U.S. Pat. No. 5,262,232 (issued Nov. 16, 1993), and Ko et. al., U.S. Pat. No. 5,308,887 (issued May 3, 1994).

Examples of thermoplastic materials suitable for use as the vibration damping material in damped laminate articles according to the present invention include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyvinyl acetyl polymers, polyamides, polyvinyl chlorides, polyethylenes, polyurethanes, and combinations thereof.

Useful viscoelastic materials can also be crosslinkable to enhance their strength and processability. Such viscoelastics are classified as thermosetting resins. When the viscoelastic material is a thermosetting resin, then prior to the manufacture of the damped laminate article, the thermosetting resin is in a thermoplastic state. During the manufacturing process, the thermosetting resin can be further cured and/or crosslinked typically to a solid state, although it could be a gel upon curing. Preferably the cured material possesses the viscoelastic properties described above. Depending upon the particular thermosetting resin employed, the thermosetting resin can include a curing agent, e.g., catalyst, which when exposed to an appropriate energy source (such as thermal energy) initiates the polymerization of the thermosetting resin. Particularly preferred viscoelastic damping materials are those based on acrylates.

In general, any suitable viscoelastic material can be used. The selection of a suitable damping material is also based on the processability of the damping material into a damped laminate article and the desired structural integrity of the finished article construction with the damping material selected. It is to be understood that blends of any of the foregoing materials can also be used.

Preferred vibration damping material layer(s) are selected from the group consisting of polyacrylates for reasons of optical clarity, resistance to aging, and excellent damping characteristics, e.g. a crosslinked acrylate having a glass transition temperature (Tg) of between 0° C. and 50° C. measured at a frequency of 10 Hz and a loss factor of at least about 0.5 when measured at a frequency of greater than or equal to 10 Hertz from 10° C. to 40° C.

Flexible Plastic Layer

The flexible plastic sheet(s) or layer(s) included in the article of the invention is typically a thermoplastic material such as polyvinyl butyral (PVB). PVB is typically used as such a layer because it has high tension modulus, it exhibits considerable elongation at rupture and because it is an efficient energy absorber. Therefore, it is effective at withstanding certain impacts. At the same time PVB has a relatively high adhesion to glass. Therefore, if the glass shatters or splinters as a result of impact or breakage of the pane, the broken glass has a tendency to be retained by the PVB. Another potentially useful flexible film is the laminate of adhesive films and polyvinyl chloride disclosed in U.S. Pat. No. 5,352,528, incorporated by reference herein. At least one layer of a flexible plastic material such as polyvinyl butyral (PVB), which is a reinforcing plastic material, is present in the article of the invention. In some cases two or more layers of flexible plastic material, such as PVB may be present. Polyvinyl butyral is advantageous due to its weather resistance and tendency not to discolor. Polyvinyl butyral is also advantageous due to its colorless nature, transparency, high degree of flexibility, and strength. Other films with equivalent characteristics would most likely be useful as a substitute for these films and are intended to be covered herein.

Article Construction

The thickness of the individual layers present in the laminate can vary, in addition to the ratios of the thickness of various layers to other layers.

Each rigid layer typically has a thickness of about 1 to about 7 mm, preferably about 2 to about 5 mm, and most preferably about 2 to about 4 mm. A thick rigid layer is desirable because of its superior properties as an acoustic barrier and of strength. However, the added mass may be undesirable in a particular application. A thin rigid layer is not as good of an acoustic barrier and also may sacrifice strength for a particular application.

The vibration damping material layer(s) typically have a total thickness of about 0.01 mm to about 0.8 mm, preferably about 0.025 mm to about 0.25 mm, and most preferably about 0.025 mm to about 0.13 mm, for reasons of optimized damping performance and manufacturability.

If the vibration damping material layer(s) total thickness is greater about 0.8 mm, the additional mass may be undesirable from an overall weight consideration. Also an increase in thickness can potentially reduce optical clarity. Moreover, a vibration damping material layer(s) having a greater total thickness may not be as efficient a damper because of reduced strain. If the vibration damping material layer(s) total thickness is less than about 0.01 mm less acoustic loss may result. Also adhesion to rough glass or plastic surfaces is more difficult with a very thin layer(s) of vibration damping material.

Each flexible plastic layer such as a PVB layer typically has a thickness of about 0.1 mm to about 1.5 mm, preferably about 0.2 to about 1.0 mm, and most preferably about 0.3 to about 0.8 mm. If such flexible plastic layer such as a PVB layer is thicker than about 1.5 mm it becomes more likely that imperfections or general reduction in clarity (haziness) would be present and the overall laminate may become too thick to be employed in conventional manufacturing processes. Moreover a thicker flexible plastic layer may be undesirable from an overall weight consideration. If a flexible plastic layer such as a PVB layer is too thin the layer may not have enough structural or cohesive strength to provide adequate safety properties. However, it is important to note that the exact thickness of a flexible plastic layer such as a PVB layer required should be determined by one skilled in the art of safety glass manufacture. It is not possible herein to list the exact dimensions and composition of the article and individual layers for a particular safety glass application. Care should be taken to make sure the laminate is both made by and tested by one skilled in the art of safety glass manufacture before using in applications where safety glass type performance is desired.

The ratio of the total thickness of the vibration damping material layer(s) to the thickness of a rigid layer typically ranges from about 1:200 (a very thin vibration damping material layer(s)) to about 1:2 (a very thick vibration damping material layer(s)), preferably about 1:100 to about 1:10, and most preferably about 1:100 to about 1:40 for reasons of damping performance, optical clarity, a good level of stiffness, weight considerations, and ease of manufacturing. Preferably the vibration damping material layer(s) has adhesive properties. However, a separate adhesive may be used to aid in adhering the vibration damping material layer(s) to a rigid layer.

The ratio of the total thickness of the vibration damping material layer(s) to a flexible plastic layer such as a PVB layer typically ranges from about 1:100 to about 10:1, preferably about 1:50 to about 1:1, and most preferably about 1:20 to about 1:2. The thickness of the flexible plastic layer such as a PVB layer(s) is determined in part by the safety properties desired. It is desirable that the total thickness of the vibration damping material layer(s) be great enough to provide adequate damping but thin enough for processing and the intended use of the laminate article.

The ratio of the thickness of a rigid layer to a flexible plastic layer such as a PVB layer typically ranges from about 200:1 to about 1:1, preferably about 100:1 to about 2:1, most preferably about 10:1 to about 3:1 for optimum optical clarity, stiffness and weight.

Damping Properties

The laminate article of the present invention will have a higher composite loss factor at the use temperature and frequency (for example, −10 to 50° C. and 20 to 2000 Hz) than would a monolithic sheet of the rigid layer having the same thickness, assuming one type of rigid layer is used. If more than one type of rigid layer is used, this should be true for any of the rigid layers. A specific temperature and frequency at which this could be measured is 20° C. and 100 Hz, for example. This results in lower levels of structural vibration in the laminate. This results in greatly decreased levels of structure borne noise and also decreased levels of air borne noise especially in the frequency range where coincidence occurs. The "composite loss factor" can be measured by using an excitation source in conjunction with an accelerometer. The signal from each is input to a Fast Fourier Transform (FFT) analyzer which outputs a transfer function. The composite loss factor is calculated using the Half Power Bandwidth Method.

A frequency response spectrum of the transfer function is obtained from the FET analyzer. A peak in the curve occurs at each modal resonance. The loss factor is determined by proceeding down the curve on both sides of the peak until the transfer function is half the value it was at the peak. The frequency difference between the two points of half power divided by the frequency at which the peak occurred is the loss factor, i.e., the width (Hz) of the resonant peak at 3 db below the peak amplitude divided by the resonant frequency (Hz) at peak amplitude.

Characteristics of the Article

The articles of the invention and the individual layers from which they are formed are typically colorless and transparent. However the article and/or one or more individual layers may optionally be tinted or have privacy coatings. Damping properties of the article of the invention result in a reduction of the resonance frequency peaks. The article of the invention and/or one or more of the individual layers may optionally be translucent and/or opaque.

Optional Layers/Components

Optionally a plasticizer resistant plastic layer(s), may be provided within the laminate. An example of such a plasticizer resistant plastic layer is polyester (PET). The plasticizer resistant plastic layer would typically have a tensile modulus of $1 \times 10^9$ to $1 \times 10^{11}$ dynes/cm$^2$ in addition to being resistant to plasticizer which may be present in the flexible plastic layer such as PVB. Such a plasticizer resistant plastic layer would typically be thin and flexible. Typically it would have a thickness of about 0.01 mm to about 0.8 mm, preferably about 0.025 mm to about 0.25 mm, more preferably about 0.025 mm to about 0.13 mm, and most preferably about 0.025 mm. Generally it would be colorless, although optionally it may be tinted or have a privacy coating thereon. Generally it would be transparent, although it may optionally be translucent or opaque. Examples of other suitable plasticizer resistant plastic layers include but are not limited to the following: polypropylene, polyimide, urethane or vinyl chloride-vinyl acetate copolymers such as described in Paquette et. al, U.S. Pat. No. 4,605,592; and the like. Such a plasticizer resistant plastic layer would typically be positioned between a layer of the flexible plastic layer such as PVB and vibration damping material layer(s). Such a plasticizer resistant plastic layer serves to prevent plasticizer, which may be present in the flexible plastic layer such as PVB, from migrating into the vibration damping material layer(s).

Optionally a vibration damping material layer(s) may be used which is resistant to plasticizer which may be contained in a flexible plastic layer such as a PVB layer. Such materials are commercially available from a number of sources. Examples of such a vibration damping material include but are not limited to the following: a terpolymer of n-butylacrylate, methylacrylate, and acrylic acid such as described in Paquette et. al, U.S. Pat. No. 4,605,592; an acrylic copolymer blended with nitrile butadiene rubber such as described in Karim, U.S. Pat. No. 4,943,461; an acrylic copolymer blended with ethylene vinylacetate such as described in Bogart et. al, U.S. Pat. No. 5,079,047; an acrylic copolymer blended with dioctyl phthalate plasticizer such as described in Landin, U.S. Pat. No. 4,946,742 and U.S. Pat. No. 4,985,488.

The laminate may optionally further comprises an adhesive layer(s). An adhesive layer may potentially be used between any two layers of the laminate to bond the two layers together. The adhesive would typically have the following properties: transparency, resistance to aging (yellowing), and solvent resistance. Examples of such adhesives include epoxies, acrylates, cyanoacrylates, silicones, and the like. It is believed that layers that would enable the laminate to also function as an antenna (conductive traces) or a defroster could also be present. Surface modification of certain layer(s) such as the optional plasticizer resistant plastic layer(s), for example, may be possible such as by priming, corona treatments, or flame treatments, to enhance bonding to the modified layer(s).

Constructions

Examples of suitable laminate constructions include but are not limited to the following:

glass/vibration damping material layer/PVB/glass;

glass/PVB/PET/vibration damping material layer/PET/PVB/glass;

glass/vibration damping material layer/PET/PVB/glass; and glass/PVB/vibration damping material layer/PVB/glass.

Rigid plastic can be used in place of one or more glass layers in the above constructions. In addition, other flexible plastic layers such as those discussed previously can be used in place of PVB. In addition, other plasticizer resistant plastic layers such as those discussed previously can be used in place of PET.

The vibration damping material as an interior layer(s) in the laminate article serves to dissipate the vibration energy into heat energy, due to the shear that is initiated in the vibration damping material.

The present invention will be better understood by referring to the following FIGS. 1–5.

FIG. 1 illustrates a side view of an embodiment of the article 2 of the invention. FIG. 1 is a construction of the following: glass/PVB/vibration damping material layer/PVB/glass. An interior layer of vibration damping material 8 is laminated between two layers of PVB each identified as 6. On the side of each PVB layer 6 opposite the vibration damping material layer 8 is a layer of glass 4 to which each PVB layer 6 is bonded.

Figure 2:
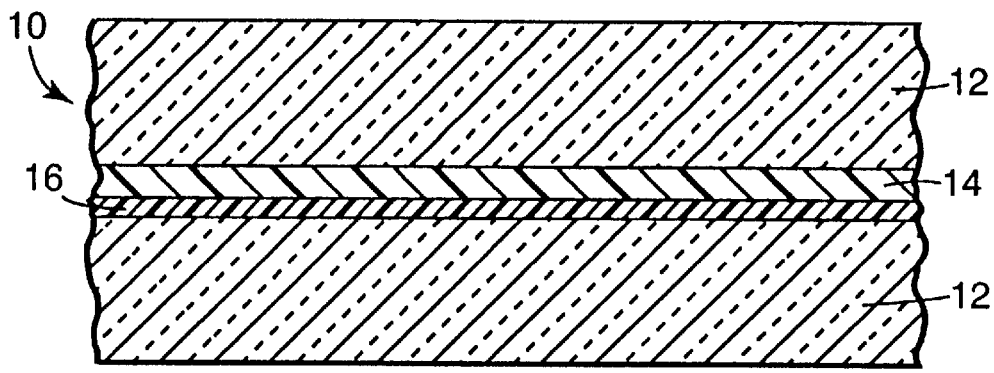
FIG. 2 illustrates a side view of another embodiment of the article of the invention.

FIG. 2 illustrates a side view of another embodiment of the article 10 of the invention. FIG. 2 is a construction of the following: glass/PVB/vibration damping material layer/glass. An interior layer of vibration damping material layer 16 is laminated to a layer of PVB identified as 14. On the side of the PVB layer 14 opposite the vibration damping material layer 16 is a layer of glass 12 to which the PVB layer 14 is bonded. On the side of the vibration damping material layer 16 opposite the PVB layer 14 is another sheet of glass 12 to which the vibration damping material layer 16 is bonded.

Figure 3:
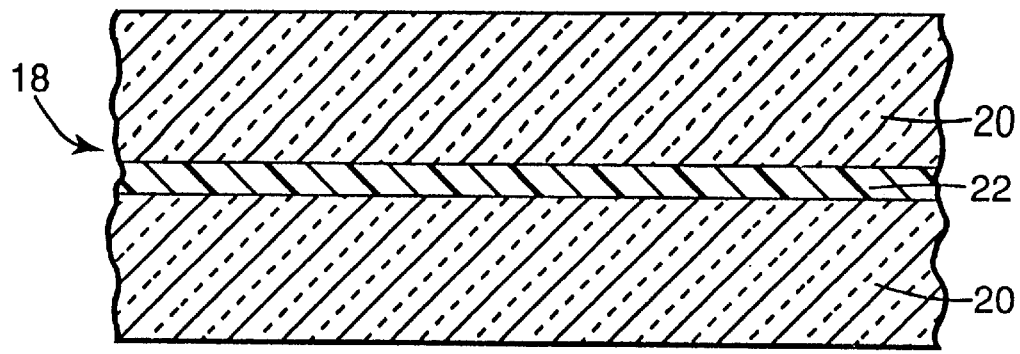
FIG. 3 illustrates a side view of a known article.

FIG. 3 illustrates a side view of a prior art article 18 having a layer of PVB 22 laminated between two layers of glass 20.

Uses Of The Article Of The Invention

The article of the invention can be fitted into a number of other articles, such as vehicles, structures, etc. The article of the invention can be used as follows: land vehicle glazing such as automobile side glass, automobile rear glass, and automobile windshields, etc.; aircraft glazing such as aircraft windshields, aircraft side glass and aircraft rear glass; watercraft glazing such as watercraft windshields, watercraft side glass, and watercraft rear glass; architectural glazing such as building windows such as office building windows, residence windows, airport windows, etc.; goggles; viewing windows; aquariums; etc. The present invention also provides buildings; crafts (vehicles) such as land vehicles, watercraft, and aircraft; goggles; viewing windows; etc.; containing the laminate article(s) of the invention.

Method of Making the Article of the Invention

The laminate article of the invention can be made by a number of different methods. As one example, a vibration damping material layer(s) when in film form can be laminated between two flexible plastic sheets such as PVB sheets or directly laminated onto a flexible plastic sheet such as a PVB sheet. However, vibration damping material layer(s) could also be coated out of a solution directly onto a flexible plastic sheet such as a PVB sheet to form an intermediate laminate. When the coated flexible plastic sheet (such as a PVB sheet) is heated, the solvent evaporates yielding a solid vibration damping material layer, to which one can laminate a second flexible plastic sheet (such as a PVB sheet) if desired. Alternatively vibration damping material(s) can be directly coated through a die onto a flexible plastic sheet (such as a PVB sheet). A plasticizer resistant sheet (such as a PET sheet) may optionally be laminated between the vibration damping material layer(s) and the flexible plastic sheet such as PVB by a number of methods including but not limited to the use of heat and/or pressure, and/or an adhesive.

The rigid glass or plastic layers can then be attached to either side of the intermediate laminate by a number of methods including but not limited to the use of heat and/or pressure, and/or an adhesive. Alternatively, sequential extrusion of the material making up the flexible plastic sheet such as PVB and vibration damping material onto one rigid glass or rigid plastic layer may occur followed by application of another rigid glass or rigid plastic layer on top of the sheet. Other methods of preparation would also be possible.

Consumer Product Safety Commission (CPSC) Test 16CFR, Part 1201

The test material (such as a test construction) to be tested is placed in a test frame with the test material oriented vertically. A bag filled with 100 pounds (45.36 kg) of lead shot is suspended from a rope and swung to impact the test material. Category I materials are tested by dropping the bag from a vertical height of 18 inches (45.72 cm) above the point of impact with a resulting impact of 150 ft-lb (20.74 kg-m). Category I materials may be used in areas of 9 square feet (0.84 m$^2$) and less. Category I materials may be used in areas greater than 9 square feet (0.84 m$^2$) and are tested by releasing the bag from a vertical height of 4 feet (1.22 m) above the point of impact with a resulting 400 ft-lb. (55.30 kg-m) impact.

One of three conditions must be met for the test material to pass this test. The test material does not break; or the test material breaks upon impact, creating an opening through which a 3-inch (7.62 cm) sphere cannot pass; or the test material shatters, but the resulting ten largest pieces do not weigh more than 10 square inches (64.52 cm$^2$) of the original test material.

EXAMPLES

The following examples further illustrate but do not limit the present invention. All parts, percentages, ratios, etc., in the Examples and elsewhere herein are by weight unless indicated otherwise.

Comparative Example 1

A 610 mm×610 mm×0.762 mm film of polyvinyl butyral, commercially available from Monsanto, was laminated at 110° C. at 6.0×10$^5$ dynes/cm$^2$ for 10 minutes between two 610 mm×610 mm×2.31 mm sheets of float glass available from Glass Service Co., St. Paul, Minn., USA.

Example 2

A construction of a 610 mm×610 mm×0.051 mm film of acrylic vibration damping material (3M Brarid ISD 112 Viscoelastic Damping Polymer, commercially available from Minnesota Mining and Manufacturing Company, St. Paul, Minn., U.S.A.) between two 610 mm×610 mm×0.381 mm films of polyvinyl butyral was prepared using hand pressure. This construction was then laminated under the same conditions as Comparative Example 1 between two 610 mm×610 mm×2.31 mm sheets of float glass available from Glass Service Co., St. Paul, Minn., USA.

Comparative Example 3

Two sheets of 610 mm×610 mm×2.31 mm sheets of float glass available from Glass Service Co., St. Paul, Minn., USA were placed together.

Resonant Vibration Testing

The articles formed according to Comparative Example 1, Example 2, and Comparative Example 3 were tested by using a PSV-200 Scanning Laser Doppler Vibrometer (from Polytec PI). Each article was supported horizontally by placing a 25 mm×25 mm×12 mm vinyl foam under each of the four corners. The force input was provided by an impact hammer. The response was measured by the Laser Doppler Vibrometer (LDV) at a point immediately adjacent to the excitation point. The LDV converted its instantaneous velocity along the beam line of sight into a corresponding velocity signal. Both input and output signals were transferred to a Tektronix 2630 FFT analyzer available from Tektronix Company, which instantaneously displayed the transfer function. The loss factor of each of the articles for modes 6, 11, and 26 was determined by using the Half Power Bandwidth Method. Modes 6, 11, and 26 were selected because they were well separated from other modes. Results are reported in Table I below.

TABLE I

| Mode | Loss Factor Comparative Ex. 1 | Loss Factor Ex. 2 | Loss Factor Comparative Ex. 3 |
|---|---|---|---|
| 6 | 0.0207 | 0.1818 | 0.0029 |
| 11 | 0.0644 | 0.1500 | 0.0024 |
| 26 | 0.0181 | 0.0765 | 0.0020 |

Forced Vibration Testing

Figure 4:
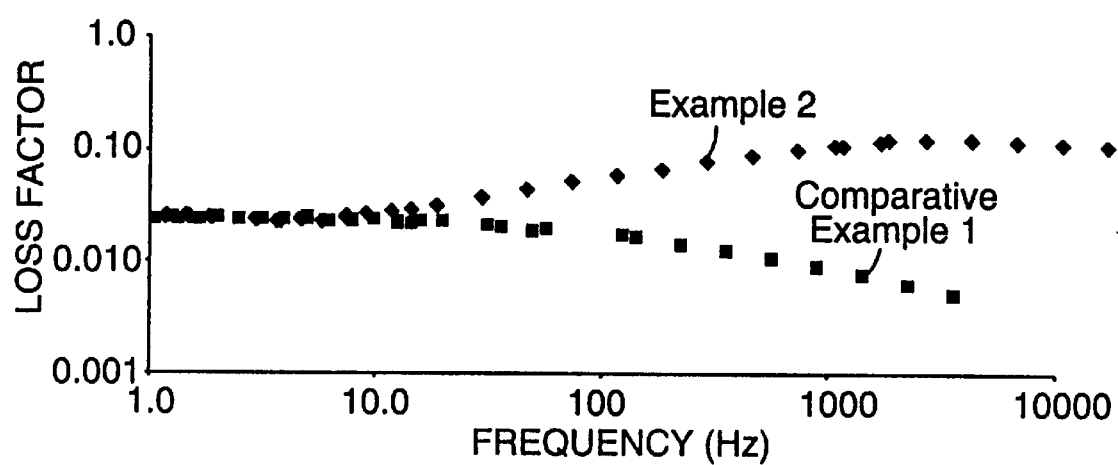
FIG. 4 is a graph illustrating the Forced Vibration Testing results for Example 2 and Comparative Example 1.

Comparative Example 1 and Example 2 were tested on an RSA II rheometer from Rheometrics using a 3 point bend geometry. Sample size was 51 mm×12.5 mm. A frequency scan from 0.1 to 100 radians/second with 5 measurements taken in each decade of frequency was done at each of four temperatures: 0, 10, 20, 30° C. The loss factor was measured at each frequency. The principle of time-temperature superposition was then used to create a master curve of loss factor versus frequency for a reference temperature of 20° C. The results are shown in FIG. 4. The addition of the viscoelastic damping polymer vibration damping layer in Example 2 increased the amount of damping of the laminate in the frequency range of most concern, 20 to 10,000 Hz.

Acoustic Testing

The transmission loss for Comparative Example 1 and Example 2 was measured according to Society of Automotive Engineers (SAE) J1400 entitled "Laboratory Measurements of the Airborne Noise Reduction of Acoustical Materials", May 1989. This test uses a white noise source in a reverberant room and a microphone to measure the amount of noise which is able to pass through the glass laminate and into an anechoic chamber. Results are shown in FIG. 5.

Figure 5:
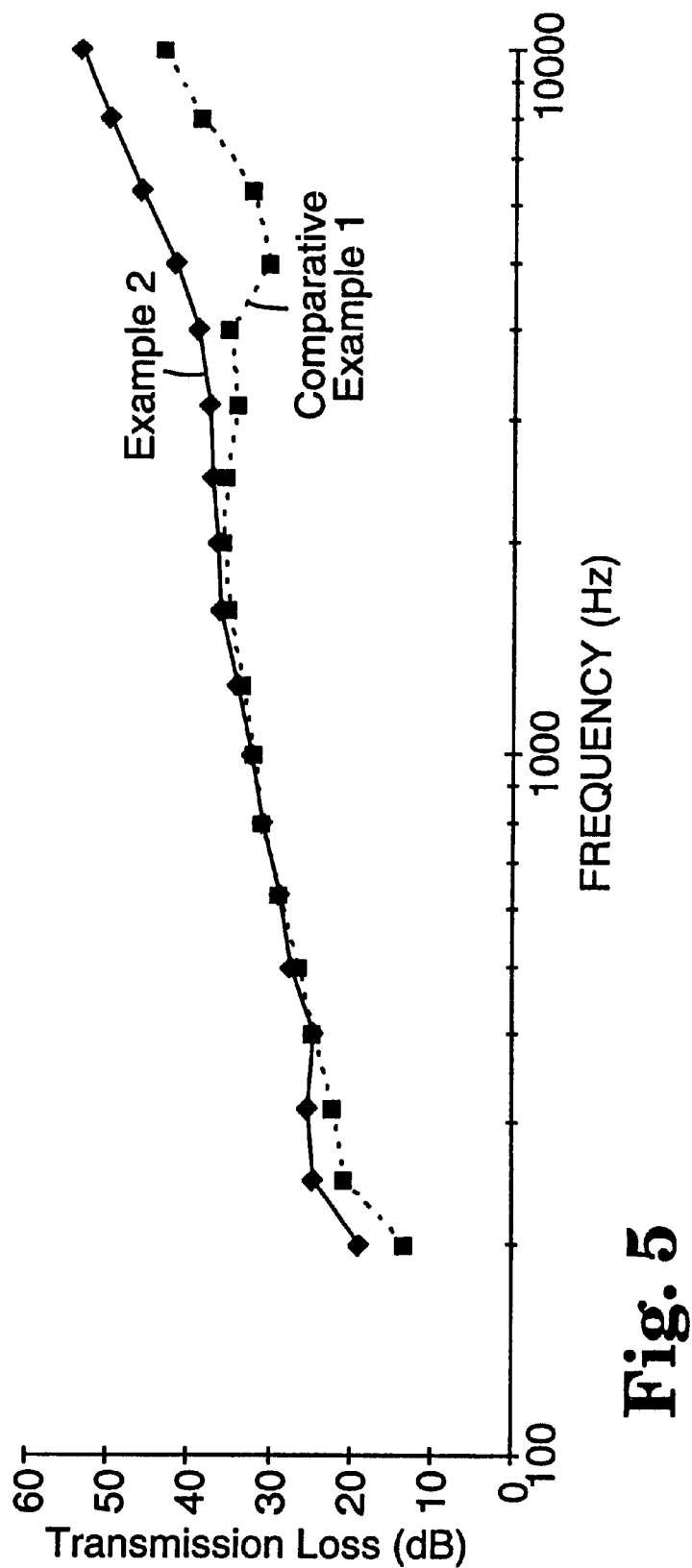
FIG. 5 is a graph illustrating Acoustic Testing results for Example 2 and Comparative Example 1.

From FIG. 5 it can be seen that the addition of the vibration damping material to the laminate increases the transmission loss both at low frequencies (100 Hz to 400 Hz) and high frequencies (1000 Hz to 10,000 Hz) where coincidence resonance commences.

Various modifications and alterations of this invention will become apparent to those skilled in the art without departing from the scope and spirit of this invention, and it should be understood that this invention is not to be unduly limited to illustrative embodiments set forth herein.

What is claimed is:

1. An article comprising a laminate, wherein the laminate comprises:
   (a) a first rigid layer formed from a material selected from the group consisting of glass and plastic;
   (b) a second rigid layer formed from a material selected from the group consisting of glass and plastic;
   (c) a vibration damping material layer(s) comprising a viscoelastic material positioned between the first rigid layer and the second rigid layer, wherein the vibration damping material layer(s) has a loss factor of at least about 0.1 at 20° C. and 10 Hz and a thickness of about 0.01 mm to about 0.8 mm; and
   (d) a first layer of a flexible plastic positioned between the first rigid layer and the vibration damping material layer(s), wherein the first layer of flexible plastic is of such a nature that a test construction of the layer of flexible plastic laminated between two sheets of annealed glass, each sheet of annealed glass having a thickness of 2.5 mm, would pass the Consumer Product Safety Commission test 16CFR, Part 1201, Category I; and
   (e) optionally a second layer of a flexible plastic positioned between the second rigid layer and the vibration damping material layer(s) wherein the second layer of flexible plastic is of such a nature that a test construction of the second layer of flexible plastic laminated between two sheets of annealed glass, each sheet of glass having a thickness of 2.5 mm, would pass the Consumer Product Safety Commission test 16CFR, Part 1201, Category I.

2. The article of claim 1 wherein the first layer of a flexible plastic positioned between the first rigid layer and the vibration damping material layer(s) is of such a nature that a test construction of the first layer of flexible plastic laminated between two sheets of annealed glass, each sheet of glass having a thickness of 2.5 mm, would pass the Consumer Product Safety Commission test 16CFR, Part 1201, Category II; and
   wherein the optional second layer of flexible plastic positioned between the second rigid layer and the vibration damping material layer(s) is of such a nature that a test construction of the second layer of flexible plastic laminated between two sheets of annealed glass, each sheet of glass having a thickness of 2.5 mm, would pass the Consumer Product Safety Commission test 16CFR, Part 1201, Category II.

3. The article of claim 1 wherein the laminate is transparent.

4. The article of claim 1 wherein the second layer of flexible plastic is present.

5. The article of claim 1 wherein the first rigid layer is glass and the second rigid layer is glass.

6. The article of claim 5 which is of such a nature that it would pass the Consumer Product Safety Commission test 16CFR, Part 1201, Category I.

7. The article of claim 5 which is of such a nature that it would pass the Consumer Product Safety Commission test 16CFR, Part 1201, Category II.

8. The article of claim 1 wherein the vibration damping material layer(s) is selected from the group consisting of urethane rubbers, silicone rubbers, nitrile rubbers, butyl rubbers, acrylic rubbers, natural rubbers, styrene-butadiene rubbers, polyesters, polyurethanes, polyamides, ethylene-vinyl acetate copolymers, and epoxy-acrylate interpenetrating networks.

9. The article of claim 1 wherein the article is a window for a vehicle or a structure.

10. The article of claim 1 wherein the article is a windshield.

11. The article of claim 1 wherein the article is colorless.

12. A vehicle having the windshield of claim 11 fitted therein.

13. The article of claim 1 wherein at least one of the vibration damping material layer(s) is plasticizer resistant.

14. The article of claim 1 which further comprises a first plasticizer resistant plastic layer between the vibration damping material layer(s) and the first flexible plastic layer and optionally a second plasticizer resistant plastic layer between the vibration damping material layer(s) and the second flexible plastic layer, if the second flexible plastic layer is present.

15. The article of claim 1 selected from the group consisting of land vehicle glazing, architectural glazing, aircraft glazing, and watercraft glazing.

16. The article of claim 1 wherein the first layer of flexible plastic is polyvinyl butyral.

17. The article of claim 1 wherein the first layer of flexible plastic is polyvinyl butyral and the second layer of flexible plastic is polyvinyl butyral.

18. A vehicle or building having at least one article of claim 1 fitted therein.

19. An article comprising a laminate, wherein the laminate comprises:

(a) a first rigid layer formed from a material selected from the group consisting of glass and plastic;

(b) a second rigid layer formed from a material selected from the group consisting of glass and plastic;

(c) an acrylate vibration damping material layer(s) comprising a viscoelastic material positioned between the first rigid layer and the second rigid layer, wherein the vibration damping material layer(s) has a loss factor of at least about 0.1 at 20° C. and 10 Hz; and (d) a first layer of a flexible plastic positioned between the first rigid layer and the vibration damping material layer(s), wherein the first layer of flexible plastic is of such a nature that a test construction of the layer of flexible plastic laminated between two sheets of annealed glass, each sheet of annealed glass having a thickness of 2.5 mm, would pass the Consumer Product Safety Commission test 16CFR, Part 1201, Category I; and (e) optionally a second layer of a flexible plastic positioned between the second rigid layer and the vibration damping material layer(s) wherein the second layer of flexible plastic is of such a nature that a test construction of the second layer of flexible plastic laminated between two sheets of annealed glass, each sheet of glass having a thickness of 2.5 mm, would pass the Consumer Product Safety Commission test 16CFR, Part 1201, Category I.

* * * * *